United States Patent Office 2,858,145
Patented Oct. 28, 1958

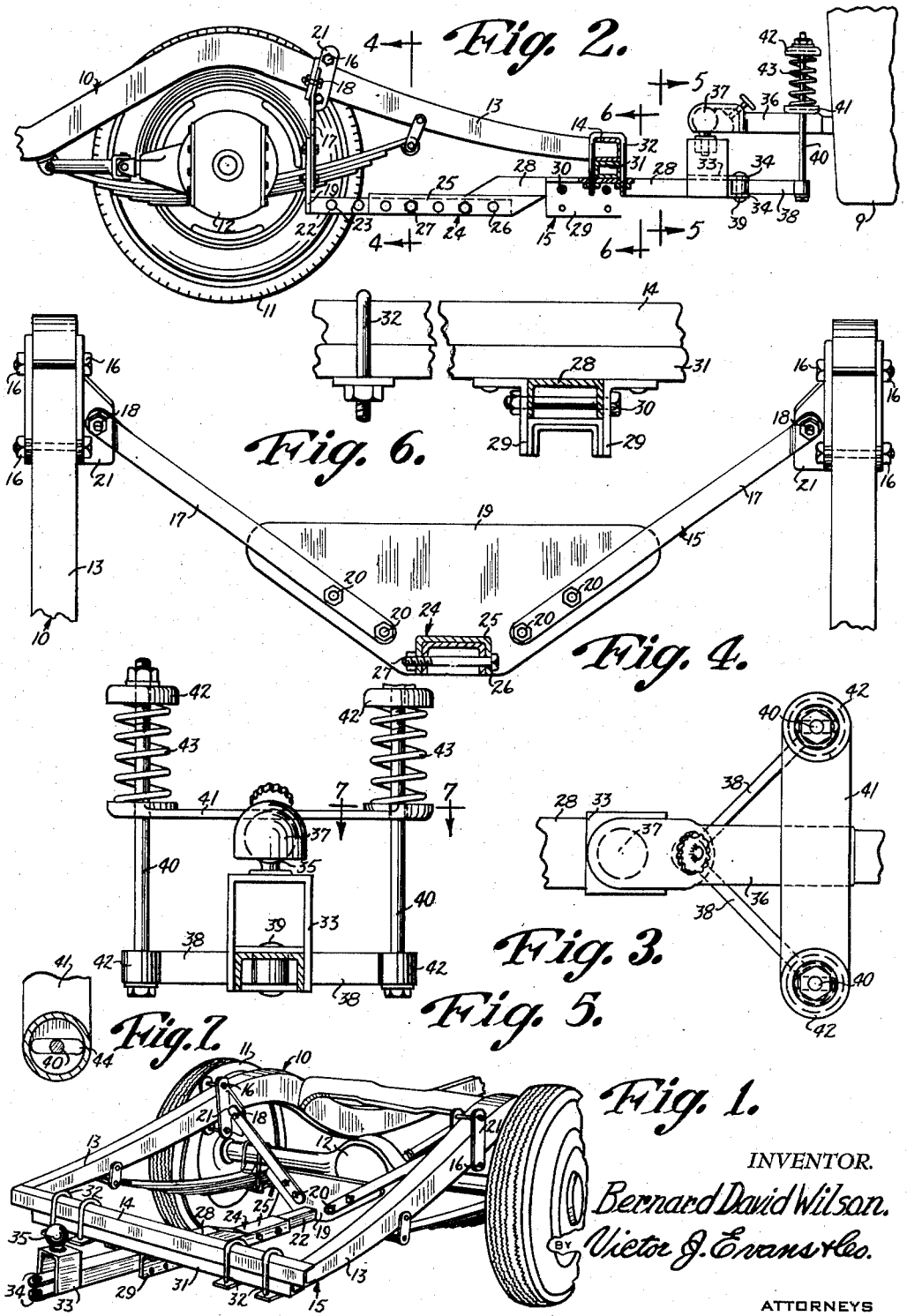

2,858,145

TRAILER HITCH

Bernard D. Wilson, Casper, Wyo.

Application September 26, 1956, Serial No. 612,169

2 Claims. (Cl. 280—483)

This invention relates to a hitch, and more particularly to a hitch for connecting a trailer to a towing vehicle such as an automobile or a truck.

The object of the invention is to provide a trailer hitch which can be readily attached to or detached from the trailer or towing vehicle, the hitch being easily and quickly installed without requiring any alteration to the towing vehicle and whereby the hitch can be adjusted as desired.

A further object of the invention is to provide an adjustable hitch which will fit various types of vehicles, and wherein the hitch can be easily and quickly installed, and wherein the hitch can be transferred from one vehicle to another as desired.

A further object of the invention is to provide a trailer hitch which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a perspective view illustrating the trailer hitch of the present invention.

Figure 2 is a side elevational view of the hitch of the present invention, with parts broken away and in section.

Figure 3 is a fragmentary plan view illustrating certain structural details of the apparatus.

Figure 4 is a sectional view taken on the line 4—4 of Figure 2.

Figure 5 is a sectional view taken on the line 5—5 of Figure 2.

Figure 6 is a sectional view taken on the line 6—6 of Figure 2.

Figure 7 is a sectional view taken on the line 7—7 of Figure 5.

Referring in detail to the drawings, the numeral 10 designates a portion of a towing vehicle such as an automobile or truck, Figure 2. The vehicle 10 includes the usual rear wheels 11, differential 12, and frame members 13 and cross piece 14.

The present invention is directed to a trailer hitch which is indicated generally by the numeral 15, and the trailer hitch 15 permits a trailer 9 to be readily towed behind the towing vehicle 10. The trailer hitch 15 of the present invention includes a pair of clamps 21 which are connected to the frame members 13 by suitable bolt and nut assemblies 16. Extending downwardly and inwardly from the clamps 21 are tongue braces 17, and the tongue braces 17 are connected to the clamps 21 by means of bolt and nut assemblies 18, Figure 4. A brace plate 19 is secured to the pair of tongue braces 17 in any suitable manner, as for example by means of bolt and nut assemblies 20. Extending rearwardly from the brace plate 19 and secured thereto in any suitable manner, as for example by welding, is a horizontally disposed bar 22 which is provided with a plurality of apertures or openings 23.

There is further provided a tongue which is indicated generally by the numeral 24, and the tongue 24 includes a front section 25 that is adjustably connected to the bar 22. The front section 25 of the tongue 24 is provided with a plurality of apertures or openings 26 which are adapted to register with the apertures 23 in the bar 22, and bolt and nut assemblies 27 are adapted to be extended through the registering apertures 26 and 23.

The tongue 24 further includes a body portion 28 which has a pair of L-shaped brackets or lugs 29 secured thereto in any suitable manner, as for example by means of securing elements 30. Extending transversely across the body portion 28 and arranged at right angles thereto is an arm 31, the arm 31 being positioned beneath the cross piece 14 of the vehicle frame. A plurality of U-bolts 32 straddle the cross piece 14 and the arm 31 for maintaining the parts in their proper assembled position.

Secured to the rear portion of the tongue 24 is a bracket 33 which may have a U-shape. The rear end of the tongue 24 is shaped to include a pair of spaced parallel apertured ears 34 for a purpose to be later described.

Extending forwardly from the trailer 9 being towed, is a support member 36, and the support member 36 is provided with a socket 37 which is arranged in engagement with a ball 35 that is mounted on the upper portion of the bracket 33, Figures 2 and 5.

There is further provided a pair of angularly arranged fingers 38 which are connected to the ears 34 by means of a bolt or pin 39. Extending upwardly from the rear ends of the fingers 38 are rods 40, and a strap 41 extends between the pair of rods 40. A collar 42 is mounted on the upper end of each of the rods 40, and a coil spring 43 is circumposed on each rod 40, the coil spring 43 being interposed between the collars 42 and the strap 41.

As shown in Figure 7, the strap 41 is provided with slots 44 through which extend the rods 40.

From the foregoing, it is apparent that there has been provided an adjustable hitch which is an improvement over the hitch shown in my prior application Serial No. 568,526, which application is now abandoned.

The adjustable hitch of the present invention can be used for different sizes of trailers and it fits all of the various late model automobiles. The hitch can be quickly and easily installed and no welding is necessary. Furthermore, the hitch can be transferred from one vehicle or automobile to another in a short period of time.

When installing the hitch, it is only necessary to place the clamps 21 in position on the frame pieces 13 just behind the differential 12 and in front of the gas tank. Then the tongue braces 17 are connected to the clamps and the cross member or arm 31 of the casing is connected to the cross piece 14 of the vehicle by means of the bolts 32. Then, the tongue 24 is placed in position over the bar 22 and secured by means of the bolts 27. The hitch is constructed so that the trailer can be towed or pulled with a maximum amount of safety. If desired, a load stabilizer can be used with the hitch so as to prevent swaying of the vehicle whereby the trailer will ride more smoothly and safely.

I claim:

1. A trailer hitch comprising a pair of spaced apart clamps, a tongue brace extending downwardly and inwardly from each of said clamps, a brace plate secured to said tongue braces, a horizontally disposed bar extending rearwardly from said brace plate and secured thereto, a tongue including a front section telescopically engaging said bar, the front section of the tongue being provided with a plurality of apertures which are adapted to register with apertures in the bar, securing elements extending through the registering apertures in said tongue and bar, said tongue further embodying a body portion, a pair of spaced apart L-shaped lugs secured to said body portion, a horizontally disposed arm secured to the upper surface of said lugs and arranged at right angles to said body portion, upper and lower apertured ears on the rear end of said body portion, a plurality of U-bolts straddling said arm, a U-shaped bracket secured to the rear of said tongue, a ball supported by said bracket, a support member having a socket engaging said ball, angularly arranged fingers connected to said lugs, rods extending upwardly from said fingers, resilient means on said rods, and a strap extending between said rods and arranged above said support member, said resilient means comprising coil springs circumposed on said rods, and collars mounted on the upper ends of said rods and engaging the upper ends of said coil springs.

2. A trailer hitch comprising a pair of spaced apart clamps, a tongue brace extending downwardly and inwardly from each of said clamps, a brace plate secured to said tongue braces, a horizontally disposed bar extending rearwardly from said brace plate and secured thereto, a tongue including a front section telescopically engaging said bar, the front section of the tongue being provided with a plurality of apertures which are adapted to register with apertures in the bar, securing elements extending through the registering apertures in said tongue and bar, said tongue further embodying a body portion, a pair of spaced apart L-shaped lugs secured to said body portion, a horizontally disposed arm secured to the upper surface of said lugs and arranged at right angles to said body portion, upper and lower apertured ears on the rear end of said body portion, a plurality of U-bolts straddling said arm, a U-shaped bracket secured to the rear of said tongue, a ball supported by said bracket, a support member having a socket engaging said ball, angularly arranged fingers connected to said lugs, rods extending upwardly from said fingers, resilient means on said rods, and a strap extending between said rods and arranged above said support member, said resilient means comprising coil springs circumposed on said rods, and collars mounted on the upper ends of said rods and engaging the upper ends of said coil springs, said strap being provided with slots through which extend said rods.

References Cited in the file of this patent
UNITED STATES PATENTS

| | | |
|---|---|---|
| 2,453,941 | Smit | Nov. 16, 1948 |
| 2,459,965 | Robertson | Jan. 25, 1949 |
| 2,635,891 | Cook | Apr. 21, 1953 |
| 2,643,891 | Mosley | June 30, 1953 |
| 2,680,626 | Hedgpeth | June 8, 1954 |
| 2,729,470 | Seitz | Jan. 3, 1956 |
| 2,743,118 | Dotson | Apr. 24, 1956 |
| 2,772,893 | Wettstein | Dec. 4, 1956 |
| 2,773,704 | Saxon | Dec. 11, 1956 |